UNITED STATES PATENT OFFICE.

MAX H. ISLER, OF MANNHEIM, GERMANY, ASSIGNOR TO THE BADISCHE ANILIN AND SODA FABRIK, OF LUDWIGSHAFEN, GERMANY.

OXYANTHRAQUINONE SULFO ACID AND PROCESS OF MAKING SAME.

SPECIFICATION forming part of Letters Patent No. 621,679, dated March 21, 1899.

Application filed June 29, 1898. Serial No. 684,754. (No specimens.)

*To all whom it may concern:*

Be it known that I, MAX H. ISLER, a citizen of the Swiss Republic, residing at Mannheim, in the Grand Duchy of Baden and Empire of Germany, have invented new and useful Improvements in the Production of Sulfo Acids of Oxy-Anthra-Quinones, of which the following is a specification.

As it is well known, amido-anthra-quinones can be diazotized by working in essentially concentrated acid solutions. I have now discovered that amido-anthra-quinones can be diazotized in fuming-sulfuric-acid solution and that by subsequent heating the corresponding oxy-anthra-quinones in the form of sulfoacids are obtained smoothly. This kind of direct conversion of amido-anthra-quinones into oxy-anthra-quinone-sulfoacids was absolutely new and unexpected, and hitherto no analogous process was employed even in the naphthalene or in the benzene series.

I desire to protect by this Letters Patent generically the process of manufacture of sulfoacids of oxy-anthra-quinones, and, besides, specifically the new sulfoacid of anthra-rufin, which can be obtained by diazotizing and subsequent heating 1.5-diamido-anthra-quinone in fuming-sulfuric-acid solution.

The following example will illustrate the manner in which my invention can be carried into practical effect:

Dissolve about ten (10) parts of 1.5-diamido-anthra-quinone in about one hundred (100) parts of fuming sulfuric acid containing about twenty to forty per cent. (20-40%) $SO_3$ and add at the ordinary temperature about ten (10) parts of solid sodium nitrite while stirring well. Then heat to about one hundred to one hundred and thirty degrees centigrade (100°-130° C.) for about two to two and a half hours. Pour the melt into water and salt out. The new sulfoacid of anthrarufin so obtained dissolves in water with a yellow color having a reddish tinge. With caustic soda it gives a bluish-red color. In alcohol the said acid is insoluble. With concentrated sulfuric acid it gives a reddish-yellow color, which on the addition of boracic acid becomes a beautiful crimson red and shows a strong reddish-yellow fluorescence. It dyes unmordanted wool yellow shades and is an important initial material for the production of dyestuffs.

The concentration of the fuming sulfuric acid may be varied in wide limits without essentially altering the result obtained.

Other specific sulfoacids of oxy-anthra-quinones may be obtained if other amido-compounds of anthra-quinone—namely, 1.3- and 1.8-diamido-anthra-quinone—are treated exactly in the same manner according to this general process hereinafter claimed. Thus a sulfoacid of the corresponding xantho-purpurin is obtained from 1.3-diamido-anthra-quinone, which is the subject of another application and therefore not specifically claimed herein. Further, a sulfoacid of chrysazin results when 1.8-diamido-anthra-quinone is treated by my new process, and similarly a sulfoacid of mono-oxy-anthra-quinone can be obtained from mono-amido-anthra-quinone in the same way, and so on. All such modifications are within the scope of my invention.

What I claim as new, and desire to secure by Letters Patent, is—

1. The process for the manufacture of sulfo-acid of oxy-anthra-quinone by diazotizing amido-anthra-quinone in fuming sulfuric acid and subsequent heating, all substantially as hereinbefore described.

2. As a new article of manufacture the new sulfo-acid of anthra-rufin such as can be obtained by diazotizing and subsequent heating 1.5-diamido-anthra-quinone in fuming-sulfuric-acid solution and which dissolves in water with a yellow color having a reddish tinge; with caustic soda it gives a bluish-red color; in alcohol it is insoluble; with concentrated sulfuric acid it gives a reddish-yellow color which on the addition of boracic acid becomes beautifully crimson red and shows a strong reddish-yellow fluorescence all substantially as hereinbefore described.

In testimony whereof I have hereunto set my hand in the presence of two subscribing witnesses.

MAX H. ISLER.

Witnesses:
GUSTAV L. LICHTENBERGER,
ADOLPH REUTLINGER.